United States Patent [19]

Kaido et al.

[11] Patent Number: 4,794,469

[45] Date of Patent: Dec. 27, 1988

[54] RECORDED DATA REPRODUCING APPARATUS

[75] Inventors: Katsuhiko Kaida; Kenji Asai, both of Tokyo, Japan

[73] Assignee: Kabushiki Kaisha Toshiba, Kawasaki, Japan

[21] Appl. No.: 75,964

[22] Filed: Jul. 21, 1987

[30] Foreign Application Priority Data

Jul. 30, 1986 [JP] Japan .................. 61-177716

[51] Int. Cl.$^4$ .................. G11B 5/09; G11B 15/14
[52] U.S. Cl. .................................. 360/46; 360/65
[58] Field of Search .............. 360/67, 46, 65, 77, 360/78

[56] References Cited

U.S. PATENT DOCUMENTS 3,593,333  7/1971  Oswald .
3,691,543  9/1972  Mueller .
4,298,898 11/1981  Cardot .................. 360/67
4,331,987  5/1982  Oda et al. .
4,480,217 10/1984  Robbins et al. .
4,544,964 10/1985  Burns et al. .
4,564,867  1/1986  Baumeister .................. 360/46
4,578,723  3/1986  Betts et al. .................. 360/67

FOREIGN PATENT DOCUMENTS 0097208  1/1984  European Pat. Off. .
60-269606  6/1985  Japan .
61-17815  5/1986  Japan .

OTHER PUBLICATIONS

IBM Technical Disclosure Bulletin, vol. 23, No. 2, Jul. 1980; pp. 738.742, N.Y., U.S.; R. C. Jahnke: "Track--Locating and-Following Apparatus for Flecible Disk File" *Whole Article*.

Primary Examiner—Vincent P. Canney
Attorney, Agent, or Firm—Oblon, Fisher, Spivak, McClelland & Maier

[57] ABSTRACT

A recorded data reproducing apparatus according to this invention comprises a data pulse generation section, a peak detection section and a control section. The data pulse generation section reads out data written on the cylinder of a recording medium on which a magnetic head is currently positioned. According to received gain data, the data pulse generation section amplifies a signal corresponding to the readout data, and selectively generates data pulse sequence based on the amplified signal. When the amplified signal corresponds to servo data, the peak detection section detects the peak value of the amplified signal. The control section determines whether or not the magnitude of the detected peak value is nearly equal to a predetermined value. If the determination is negative, the control section refers to a gain data table to determine a change amount of the gain data, and supplies the gain data updated based on the change amount of the data pulse generation section.

12 Claims, 4 Drawing Sheets

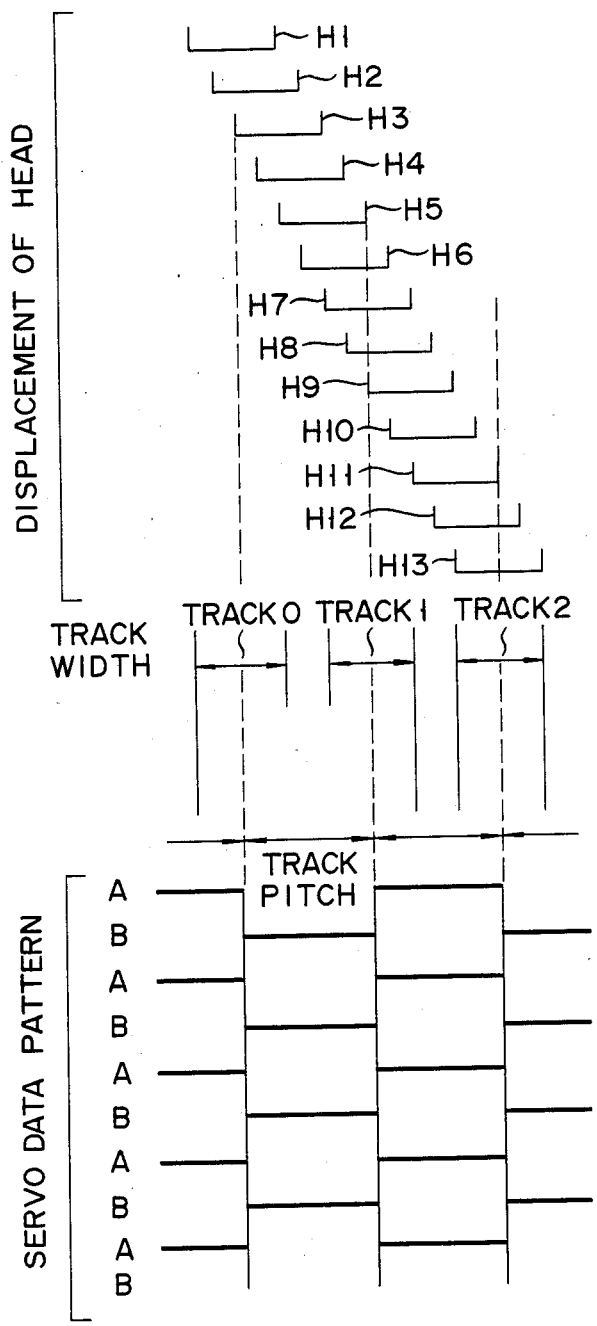
F I G. 2

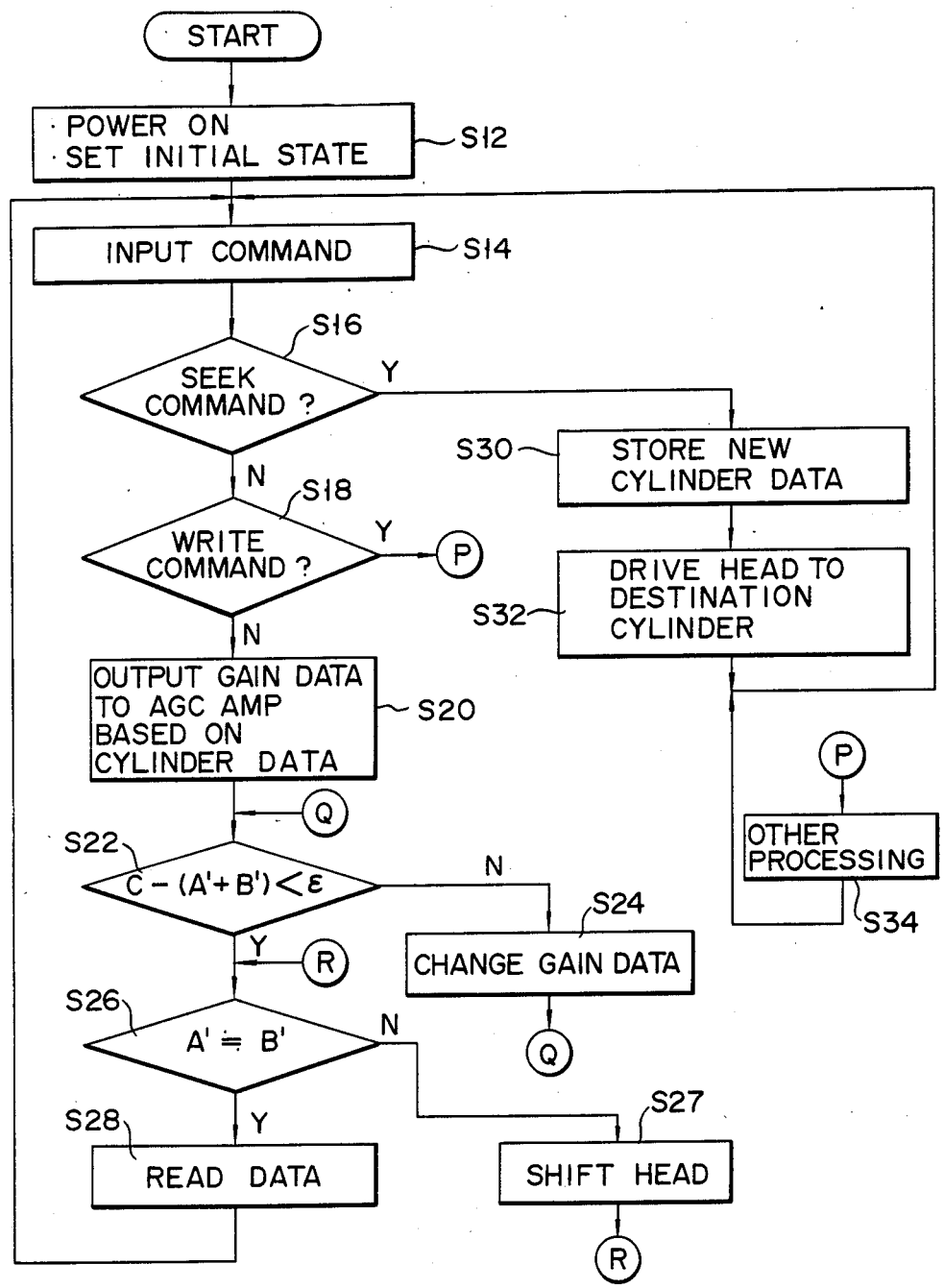
F I G. 4

RECORDED DATA REPRODUCING APPARATUS

BACKGROUND OF THE INVENTION

This invention relates to a recorded data reproducing apparatus, which can accurately read data from any track or cylinder of a recording medium, based on servo data recorded on the medium.

Because of the necessity for accurately positioning a read head on a target track, a recorded data reproducing apparatus needs to ensure that a signal corresponding to servo data is at a constant level. Conventional recorded data reproducing apparatuses have an AGC amplifier which amplifies a signal read by the read head and has a gain data input terminal. The gain of the AGC amplifier is varied in accordance with gain data supplied to the gain data input terminal. This gain data is generated by an AGC generator based on the output of a differential circuit provided at the succeeding stage of the AGC amplifier. The AGC generator is constituted by complex circuits, such as a rectifier/smoothing circuit for averaging the output of the differential circuit, an amplifier and a level shifter. Therefore, complicated adjustment of the AGC generaoor is required in the manufacturing process. This increases the manufacturing cost of a recorded data reproducing apparatus.

SUMMARY OF THE INVENTION

Accordingly, it is the object of this invention to provide a recorded data reproducing apparatus which has a simple configuration and can obtain data pulse sequence with a desired accuracy and at high speed. The recorded data reproducing apparatus according to this invention comprises:

data pulse generator means for sequentially reading out data written on a cylinder of a recording medium on which a head is currently positioned, for amplifying a signal corresponding to the readout data in accordance with gain data supplied thereto, and for selectively generating the data pulse sequence based on the amplified signal;

peak detection means for selectively detecting peak values of the amplified signal; and control means for supplying the gain data currently designated to the data pulse generator means, for referring to a gain data table based on a sum of the peak valves detected by the peak detection means to determine a change amount of the gain data, for combining the gain data and the change amount to update the gain data, and for outputting the gain data combined to the data pulse generator means.

The servo data has two patterns that are arranged so as to be alternately read out.

The control means includes:

a gain data table for storing the change amount of the gain data with respect to the sum of the peak values detected by the peak detection means; and means for updating the gain data until the sum of the peak values falls within a predetermined error range with respect to a predetermined value.

As explained above, according to this invention, the gain of the AGC amplifier can be adjusted to a proper value necessary for positioning a magnetic head, without using a complicated AGC generator. With this gain adjustment, the AGC amplifier can have a simple configuration and accurate head positioning can alaays be ensured.

BRIEF DESCRIPTION OF THE DRAWINGS

FIG. 2 is a diagram for explaining the relationship between a magnetic head and servo data;

FIG. 4 is a flowchart for explaining the operation of the recorded data reproducing apparatus of this invention.

DESCRIPTION OF THE PREFERRED EMBODIMENT

Figure 1:
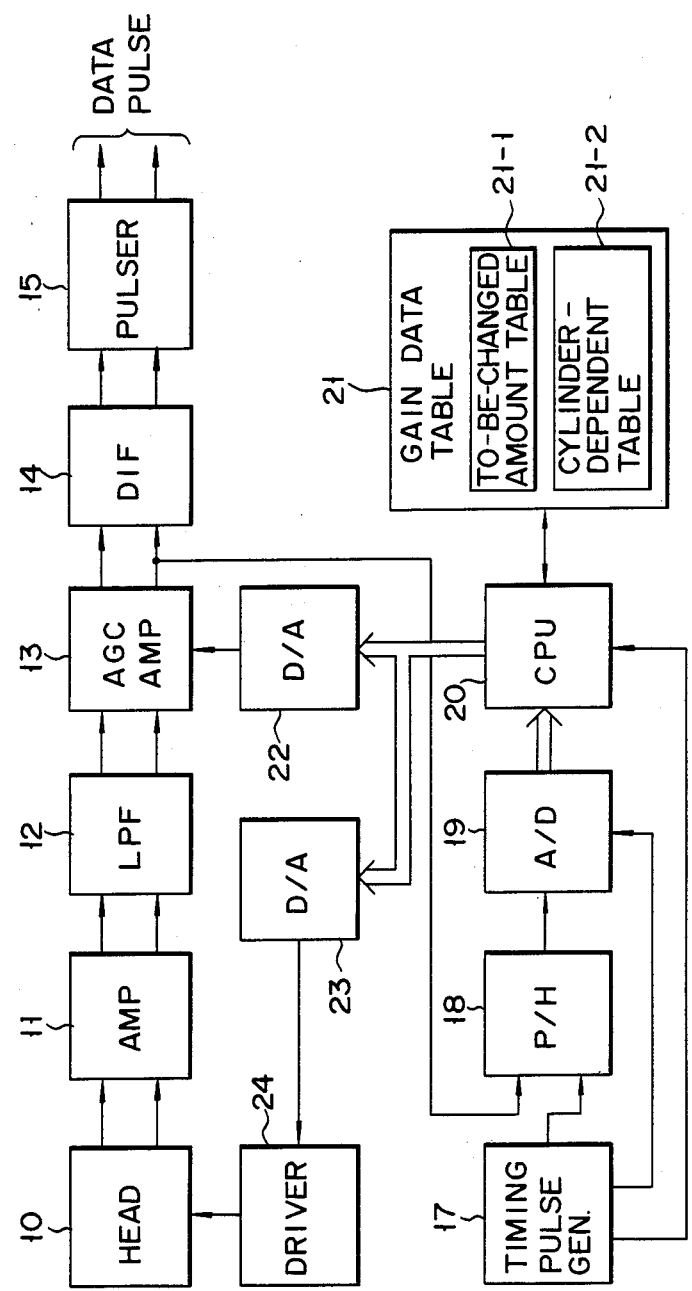
FIG. 1 is a block diagram of a recorded data reproducing apparatus according to an embodiment of this invention.

A recorded data reproducing apparatus according to an embodiment of this invention will now be explained in detail with reference to the accompanying drawings.

Servo data is recorded in advance on a recording medium, e.g., a disk. As shown in FIG. 2, different servo data patterns indicated by "A" and "B" in FIG. 2 extend on the opposite sides from the center of a track or a cylinder. When a magnetic head 10 relatively moves on the cylinder (actually, the disk rotates with magnetic head 10 fixed), patterns A and B are alternately read by magnetic head 10. Consequently, signals corresponding to those patterns A and B alternately appear.

As the disk rotates, the speed of the servo data with respect to the magnetic head varies between an inner cylinder and an outer cylinder. Even if the same servo data is recorded on the inner and outer cylinders, therefore, there would be a difference in a peak intensity of signals picked up from these cylinders by magnetic head 10. This would cause various inconveniences; mainly, it is difficult to provide accurate head positioning. Therefore, it is necessary to attain approximately constant peak output, irrespective of the position of a target cylinder on the disk.

Magnetic head 10 reads out data, which has been recorded in advance on the disk so as to sequentially appear as the disk rotates. A signal corresponding to the read data is supplied to an amplifier 11 for amplification. The signal amplified by amplifier 11 is supplied to a low-pass filter (LPF) 12, which filters out its low-frequency noise. The filtered signal is then supplied to an AGC amplifier 13, which is also supplied with gain data from a CPU 20 through D/A converter 22, in accordance with the position of a presently designated cylinder. AGC amplifier 13 changes its gain in accordance with the received gain data, amplifies the signal from low-pass filter 12, and supplies the amplified signal to differential circuit (DIF) 14 as well as to peak hold circuit (P/H) 18. When the data readout by magnetic head 10 is not servo data but recorded data, differential circuit 14 differentiates the signal from AGC amplifier 13 to detect the zero crossing point of the received signal. The output of differential circuit 14 is supplied to a pulser 15 where a data pulse is created based on the detected zero crossing point. Amplifier 11, low-pass filter 12, AGC amplifier 13, differential circuit 14 and pulser 15 constitute a data pulse generation section.

Peak hold circuit 18 receives a timing pulse from timing pulse generator 17 in addition to the output of AGC amplifier 13. Peak hold circuit 18 holds the peak value of the amplified signal from AGC amplifier 13 in response to the timing pulse. At this time, when the data readout by magnetic head 10 is servo data, a timing pulse for holding the peak value of the amplified signal corresponding to the servo data is supplied to peak hold circuit 18 from timing pulse generator 17. An A/D converter 19 converts the peak value held by peak hold circuit 18 into digital data and outputs it to CPU 20. As mentioned earlier, the digital data corresponding to patterns A and B are sequentially supplied to CPU 20. Timing pulse generator 17, peak hold circuit 18 and A/D converter 19 constitute a servo data peak hold section.

CPU 20 determines cylinder-dependent gain data for the position of the presently designated cylinder and outputs the gain data to AGC amplifier 13 through D/A converter 22. In addition, CPU 20 receives and holds digital data from A/D converter 19, e.g., a peak value A' corresponding to pattern A. CPU 20 then receives and holds a peak value B' that corresponds to pattern B following pattern A, and adds those peak values A' and B'. Based on the added result A'+B', CPU 20 refers to a to-be-changed amount table 21-1 of a gain data table 21 to attain the amount of a change that should be made to the gain data. In addition to the to-be-changed amount table 21-1, in which the amount of change in gain data for head-positioning with respect to the summed result from CPU 20 is registered in advance, gain data table 21 includes cylinder-dependent table 21-2, which stores cylinder-dependent gain data for the cylinder position presently stored in a cylinder data storage region (not shown). The optimal gain data for the cylinder on which magnetic head 10 presently lies is attained from the amount of change in gain data change and the cylinder-dependent gain data.

Thus attained gain data is supplied to D/A converter 22 for analog conversion and ss then supplied to AGC amplifier 13. The sum of the peak values of digital data corresponding to servo data patterns A and B is maintained approximately at a predetermined value by repeating the aforementioned operational sequence through the closed loop which is formed by the aforementioned peak hold circuit 18, A/D converter 19, CPU 20, D/A converter 22 and AGC amplifier 13.

When the sum A'+B' of the peak values is nearly constant, CPU 20 calculates the difference A'-B' between the peak values and outputs data corresponding to this difference to D/A converter 23. D/A converter 23 converts the received difference data into analog data and outputs it to driver 24. Based on the received analog data, driver 24 drives magnetic head 10 to position it at the proper cylinder location.

Referring now to FIG. 4, the operation of this embodiment will be explained.

At a starting step (S12), a disk drive is powered on and the initializing procedures, such as detection of the position of the zero cylinder, are carried out. In subsequent step S14, the recorded data reproducing apparatus is ready for receiving any command.

The type of an input command is determined in steps S16 and S18. In step S16, it is determined whether or not the input command is a seek command, and if YES, the flow advances to step S30 where cylinder data specified by the seek command is stored in the cylinder data storage region. If NO in step S16, the flow advances to step S18 where this time, it is determined whether or not the input command is a write command. If the decision is affirmative in step S18, the flow advances to step S34, and if it is negative, the input command is determined to be a read command and the flow advances to step S20.

FIGS. 3A–3M illustrate the waveforms of the outputs from AGC amplifier 13 respectively for the positions H1 to H13 (see FIG. 2) of magnetic head 10. For example, the input command is a seek command to move magnetic head 10 to cylinder or track 2 from cylinder or track 1 as shown in FIG. 2, the cylinder position specified by the seek command is stored in the cylinder data storage region in step S30. In the subsequent step S32, magnetic head 10 is moved to the designated cylinder position.

When the input command is a write command, other processings are carried out in step S34. When it is a read command that has been input, the cylinder position at which magnetic head 10 is presently located is read out from the cylinder data storage region in step S20. Based on the readout cylinder position, cylinder-dependent table 21-2 is referred to, thus providing cylinder-dependent gain data. This cylinder-dependent gain data is supplied through D/A converter 22 to AGC amplifier 13. In the subsequent step S22, it is determined whether or not the sum of two peak values A' and B' supplied through A/D converter 19 from peak hold circuit 18 is within a predetermined allowable error range $\epsilon$ from a predetermined value C. If the decision is negative in step S22, step S24 is executed so that gain data to be output to AGC amplifier 13 is changed. More specifically, based on the sum of peak values A' and B', gain data table 21 is referred to for determination of the to-be-changed amount of gain data, and this to-be-changed amount of gain data is coupled to the cylinder gain data. The resultant gain data is then supplied again to AGC amplifier 13 to optimize the gain thereof. Thereafter, step S22 is repeated, and if the decision is affirmative in this step, the subsequent step S26 is executed.

Figure 3:
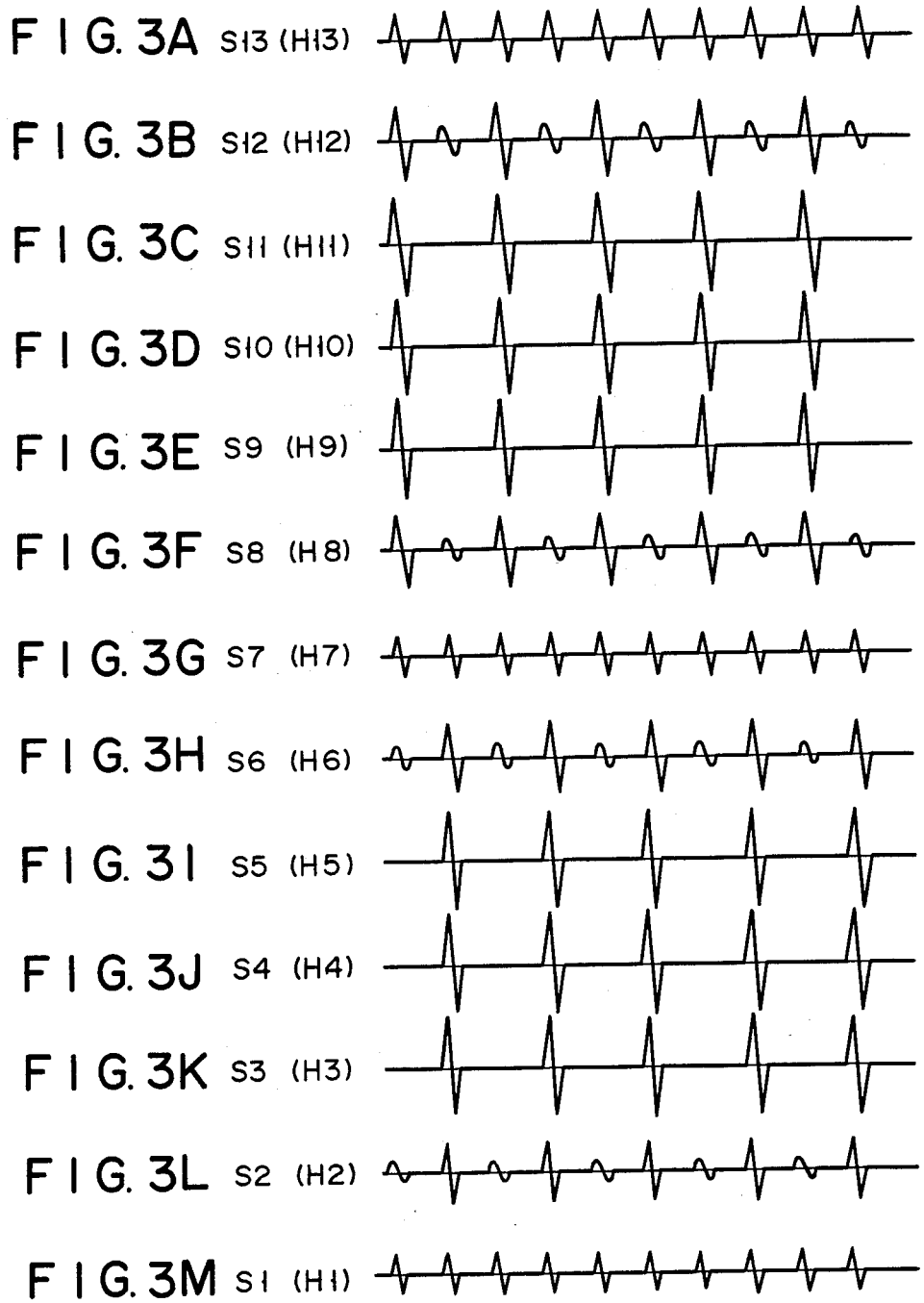
FIGS. 3A through 3M are diagrams showing the waveforms of amplified signals corresponding to the servo data located at the positions shown in FIG. 2.

In step S26, it is checked if two peak values A' and B' are nearly equal to each other. If the determination in step S26 is negative, the flow advances to step S27. For instance, when magnetic head 10 is positioned at H12 in FIG. 2, peak value A' does not equal to peak value B' as shown in FIG. 3B. This is a natural consequence because the major portion of the detection region of magnetic head 10 with respect to the recording medium is on the side of pattern A. To cope with this peak imbalance, magnetic head 10 needs to be moved to the rightward in FIG. 2. For this purpose, CPU 20 calculates the difference between peak values A' and B', or A'-B', and outputs the calculation result to D/A converter 23. D/A converter 23 converts the received digital value into an analog value and then supplies it to driver 24. Based on the analog value (representing the calculation result from CPU 20), driver 24 moves magnetic head 10 to the proper position H13 in FIG. 2. The waveform of the resultant signal would have a nearly equal peak value for patterns A and B as shown in FIG. 3A. Thereafter, step S26 is executed again.

In the subsequent step S28, recorded data following the servo data is read out from the cylinder on which magnetic head 10 is presently positioned. The output of AGC amplifier 13 is supplied to differential circuit 14 and then to pulser 15 where a data pulse is produced.

As has been described in detail, according to this invention, accurate head positioning can be carried out with a simple circuit arrangement, which is very effective in increasing the cylinder density.

In the aforementioned embodiment, the cylinder-dependent gain data is output first, when a read command is entered after magnetic head 10 is shifted by a seek command. This operation may be modified such that the gain data determined by the previous read command is stored and this stored gain data is output first when the next read command is entered. This modification can eliminate the need to use the cylinder-dependent table.

What is claimed is:

1. A recorded data reproducing apparatus having a simple configuration and being capable of obtaining data pulse sequence with a desired accuracy and at high speed, said recorded data reproducing apparatus comprising:

data pulse generator means for sequentially reading out data written on a cylinder of a recording medium on which a head is currently positioned, for amplifying a signal corresponding to the readout data in accordance with gain data supplied thereto, and for selectively generating the data pulse sequence in accordance with the amplified signal;

peak detection means for selectively detecting peak values of the amplified signal; and a gain data table for storing a change amount of the gain data with respect to a sum of the peak values; and control means for supplying the gain data currently designated to said data pulse generator means, for referring to said gain data table in accordance with the sum of the peak values detected by said peak detection means to determine the change amount of the gain data, when the sum of the peak values does not fall within a predetermined error range with respect to a predetermined value, and for designating the gain data updated by the determined change amount.

2. The apparatus according to claim 1, wherein said data pulse generator means includes means for generating the data pulse sequence when the readout data corresponds to recorded data, and said peak detection means includes means for detecting the peak values when the readout data corresponds to servo data.

3. The apparatus according to claim 2, wherein the servo data has two patterns that are arranged be alternately read out by said head.

4. The apparatus according to claim 3, wherein the servo data is written on respective disks.

5. The apparatus according to claim 3, wherein the servo data is written on a specific disk.

6. The apparatus according to claim 1, wherein said control means further includes means for holding the gain data currently designated, until the change amount of the gain data is input, when a cylinder position of said head is changed in accordance with an input seek command.

7. The apparatus according to claim 1, wherein said control means further includes:

a cylinder-dependent gain data table for storing gain data with respect to a cylinder position; and designating means for, upon inputting of a seek command, referring to said cylinder-dependent gain data table in accordance with the cylinder position specified by the seek command to designate the gain data for the specified cylinder position.

8. The apparatus according to claim 1, wherein said apparatus further comprises drive means for adjusting a head position in accordance with difference data input thereto to center said head on the cylinder; and wherein said control means further includes means for calculating the difference data corresponding to a difference between the peak values when the sum of the peak values falls within the predetermined error range with respect to the predetermined value, and for outputting the differences data to said drive means.

9. A method of being capable of obtaining data pulse sequence with a desired accuracy and at high speed, comprising:

sequentially reading out data written on a cylinder of a recording medium on which a head is currently positioned;

amplifying a signal corresponding to the readout data in accordance with gain data currently designated;

selectively generating the data pulse sequence in accordance with the amplified signal;

selectively detecting peak values of the amplified signal;

referring to a gain data table in accordance with a sum of the detected peak values to determine a change amount of the gain data, when the sum of the peak values does not fall wihin a predetermined error range with respect to a predetermined value; and designating the gain data updated by the determined change amount.

10. The method according to claim 7, further comprising holding the gain data, until the determined change amount of the gain data is input, when a cylinder position of the haad is changed in accordance with an input seek command.

11. The method according to claim 9, further comprising referring to a cylinder-dependent gain data table in accordance with the cylinder position specfied by a seek command to designate the gain data for the specified cylinder position when the seek command is input.

12. The method according to claim 9, further comprising: calculating differences data corresponding to a differnece between the peak values when the sum of the peak values falls within the predetermined error range with respect to the predetermined value; and adjusting a head position in accordance with the calculated difference data to center the head on the specified cylinder.

* * * * *